United States Patent
Chung et al.

(10) Patent No.: US 7,538,711 B2
(45) Date of Patent: May 26, 2009

(54) INTEGRATED REMOTE CONTROL DEVICE RECEIVING MULTIMODAL INPUT AND METHOD OF THE SAME

(75) Inventors: Ji-hye Chung, Seoul (KR); Myung-hyun Yoo, Seongnam-si (KR); Kee-eung Kim, Seoul (KR); Seung-nyang Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 420 days.

(21) Appl. No.: 11/233,114

(22) Filed: Sep. 23, 2005

(65) Prior Publication Data

US 2006/0077174 A1 Apr. 13, 2006

(30) Foreign Application Priority Data

Sep. 24, 2004 (KR) .................... 10-2004-0077213

(51) Int. Cl.
*G08C 19/12* (2006.01)
(52) U.S. Cl. .................... 341/176; 341/174; 341/173; 345/156; 340/825.25; 340/825.69; 340/825.72; 700/17; 700/83
(58) Field of Classification Search ............ 341/176, 341/174, 173; 348/14.01, 601, 725, 563, 348/734; 704/275, 264, 270, 270.1; 700/19, 700/17, 83; 345/156, 158, 163, 169; 701/36, 701/49; 340/825.25, 825.69, 825.72
See application file for complete search history.

(56) References Cited

U.S. PATENT DOCUMENTS

| 5,878,394 | A | 3/1999 | Muhling |
| 6,438,523 | B1 * | 8/2002 | Oberteuffer et al. ......... 704/270 |
| 6,553,345 | B1 * | 4/2003 | Kuhn et al. ................. 704/275 |
| 7,158,871 | B1 * | 1/2007 | Ilan et al. ...................... 701/49 |
| 2003/0234737 | A1 * | 12/2003 | Nelson et al. ............... 341/176 |
| 2005/0159823 | A1 * | 7/2005 | Hayes et al. .................. 700/19 |
| 2006/0152401 | A1 * | 7/2006 | Spilo .......................... 341/176 |

\* cited by examiner

*Primary Examiner*—Benjamin C Lee
*Assistant Examiner*—Sisay Yacob
(74) *Attorney, Agent, or Firm*—Staas & Halsey LLP (57) ABSTRACT

An integrated remote control device and method using multimodal inputs are provided. The integrated remote control device may include an input module that receives inputs of at least two modalities from a user, a first modality recognition module that recognizes and interprets an input of a first modality received from the input module, a second modality recognition module that recognizes and interprets an input of a second modality received from the input module, a command database (DB) that stores commands, a control module that interprets a user command by synthesizing information about the inputs interpreted by the first and second modality recognition modules, and extracts a control command that corresponds to the interpreted user command from the command DB, and an output module that outputs the control command extracted by the control module.

36 Claims, 8 Drawing Sheets

INTEGRATED REMOTE CONTROL DEVICE RECEIVING MULTIMODAL INPUT AND METHOD OF THE SAME

CROSS-REFERENCE TO RELATED APPLICATIONS

This application claims priority from Korean Patent Application No. 10-2004-0077213 filed on Sep. 24, 2004 in the Korean Intellectual Property Office, the disclosure of which is incorporated herein by reference in its entirety.

BACKGROUND OF THE INVENTION

1. Field of the Invention

The present invention relates generally to an integrated remote control device and a method of controlling the integrated remote control. More particularly, embodiments of the present invention relate to an integrated remote control device using a multimodal input and a method of controlling the integrated remote control, in which operations of two or more electronic products are remotely controlled by recognizing a user command from multimodal input data such as a spoken word, a gesture, or the like, so that the user command interpretation error rate can be reduced, and convenience of controlling a plurality of electronic products using a single remote control device can be realized.

2. Description of the Related Art

Button-type remote control devices, which receive a user command through a button, have become the mainstream in the related art. However, a trend toward minimization and simplification of remote control devices has emerged, as have interfaces other than button type interfaces. Namely, remote control devices that recognize voice or gesture commands have been introduced. These remote control devices recognize a user command from the various types of input data, such as a spoken word, a gesture, or a command from graphical user interface, to remotely control electrical products. Such remote control devices are disclosed in many patents. For example, U.S. Pat. No. 5,878,394 discloses a device and a method of controlling a remote control network based on a PC that receives voice commands from a user.

However, there are frequently command interpretation errors in such a system.

SUMMARY OF THE INVENTION

An aspect of the present invention provides an integrated remote control device in which input data of two or more modes are combined to supplement a defect of each mode and maximize an advantage thereof to reduce the user command interpretation error rate so that the user command can be effectively executed.

An aspect of the present invention also provides an integrated remote control device which is convenient for use by shortening a command step, which must be executed in multi-steps, to remotely control a plurality of electronic products that operate in connection with one another.

An aspect of the present invention also provides an integrated remote control device miniaturized and simplified by using input data of a mode other than a button.

According to an aspect of the present invention, there is provided an integrated remote control device using multi-modal inputs, including: an input module that receives inputs of at least two modalities from a user; a first modality recognition module that recognizes and interprets an input of a first modality received from the input module; a second modality recognition module that recognizes and interprets an input of a second modality received from the input module; a command database (DB) that stores commands; a control module that interprets a user command by synthesizing information about the inputs interpreted by the first and second modality recognition modules, and extracts a control command that corresponds to the interpreted user command from the command DB; and an output module that outputs the control command extracted by the control module.

According to another aspect of the present invention, there is provided an integrated remote control system in which a control device remotely controls a controlled device using a control command, the control device including: a command database (DB) that stores commands; a control module that interprets a user command and extracts a control command that corresponds to the interpreted user command from the command DB; and an output module that outputs the control command extracted by the control module, wherein the controlled device includes: an input module that receives inputs of at least two modalities from the user; a first modality recognition module that recognizes and interprets an input of a first modality received from the input module; and a second modality recognition module that recognizes and interprets an input of a second modality received from the input module.

According to still another aspect of the present invention, there is provided an integrated remote control method using multi-modal inputs, including: receiving inputs of at least two modalities from a user; recognizing and interpreting each of the input of the at least two modalities; interpreting a command of the user by synthesizing the inputs of at least two modalities; extracting a control command that corresponds to the interpreted user command; and outputting the extracted control command.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
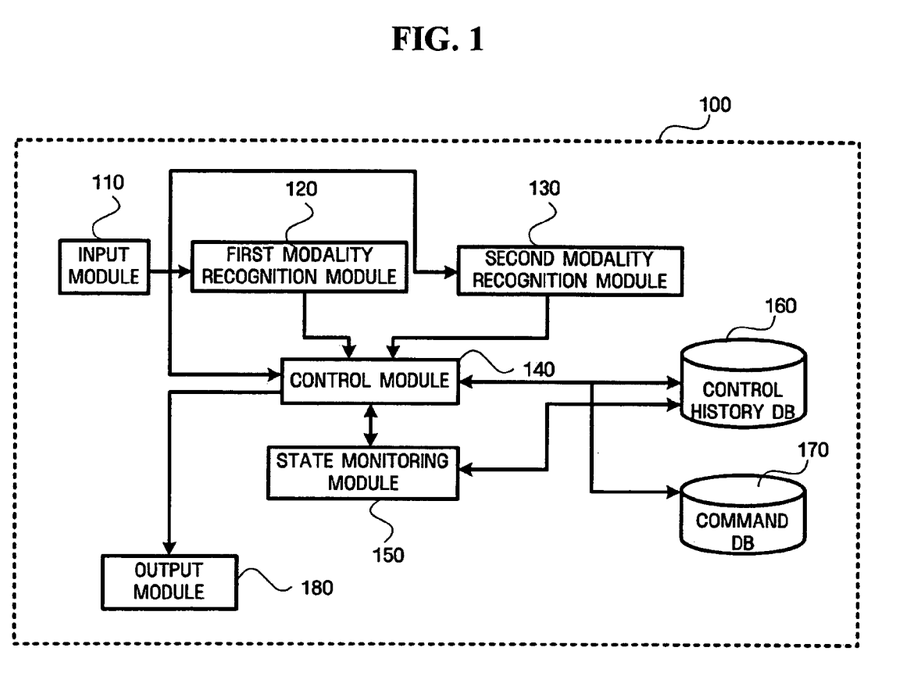
FIG. 1 is a block diagram of an integrated remote control device, according to an embodiment of the present invention.

FIG. 1 is a block diagram of an integrated remote control device 100, according to an embodiment of the present invention.

Referring to FIG. 1, the integrated remote control device 100 may be comprised of an input module 110, a first modality recognition module 120, a second modality recognition module 130, a control module 140, a state monitoring module 150, a control history database (DB) 160, a command DB 170, and an output module 180.

The term "module", as used herein, refers to, but is not limited to, a software or hardware component such as a Field Programmable Gate Array (FPGA) or an Application Specific Integrated Circuit (ASIC), which performs certain tasks. A module may advantageously be configured to reside on an addressable storage medium and configured to execute on one or more processors. Not by way of limitation, but by way of example, a module may include components such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute on one or more CPUs in a communication system.

The input module 110 may receive inputs of various modalities such as a voice command or a gesture from a user and transmit the inputs to modules for recognition and interpretation (namely, the first and second modality recognition modules 120 and 130). The input module 110 may be a microphone that may receive a voice, or a sensor which may sense a gesture. When a new command, other than a basic command preset by the provider of the integrated remote control device, is defined by a user, or a basic command is revised, the input module 110 may receive the new user-defined command or the data used for revising the basic command from a user interface. This user interface may support a user input mode that receives the user-defined command that is received, and provide the new user-defined command or the data to the control module 140.

The first modality recognition module 120 may recognize and interpret user input data of a first modality received from the input module 110. For convenience of explanation, the first modality recognition module 120 is assumed to be a speech recognition module. However, the present invention is not limited to such a configuration. The speech recognition module can adopt a general speech recognition algorithm. The general speech recognition algorithm may include the operations of: receiving speech from a user and finding the part of the received speech data that corresponds to a command; analyzing features of this speech data; performing a global search of pre-stored speech features to find the speech features most similar to the analyzed speech feature; and/or outputting text that corresponds to the received speech. The speech recognition module may transmit the text to the control module 140.

The second modality recognition module 130 may recognize and interpret user input data of a second modality received from the input module 110. For convenience of explanation, the second modality recognition module 130 is assumed to be a gesture recognition module. However, the present invention is not limited to such a configuration. The gesture recognition module may contain a well known a general gesture recognition algorithm. The general gesture recognition algorithm may comprise the operations of: finding the part of received data that corresponds to a gesture; analyzing features of this found gesture data; performing a search of pre-stored gesture patterns to find the gesture features matched with the analyzed gesture feature, outputting a gesture set that corresponds to the received gesture of a user. The gesture recognition module may send the gesture set to the control module 140.

The control history DB 160 may store a history of state information about each controlled device that depends upon a result of execution of a produced control command corresponding to a command of a user.

The command DB 170 may store commands provided by the integrated remote control device 100 and correlations between devices to be remotely controlled.

A command stored in the command DB 170 may be classified as a basic command, which is supplied by a provider, or a user-defined command, which is defined by a user. A basic command may be a frequently used command pre-defined by the provider of the integrated remote control device by analyzing the frequency and form of a device that is to be controlled by a user. A user-defined command may be a newly defined or revised command. For example, if a user has an inclination toward repetitively pressing down on a volume-down button instead of using a mute button to rapidly reduce the volume, this behavior can be set to a specific gesture and provided as a basic command. Additional user-defined commands can be produced as user demands. The production of a user-defined command will be described later with reference to operations S430 and S440 of FIG. 4.

The commands stored in the command DB 170 can be classified into simple control commands or complex control commands according to the form in which the command is executed. A simple control command may control a single state of a single controlled device. A complex control command may control states of the controlled devices that are correlated. A complex control command may be a combination of simple control commands. A simple control command and the complex control command may be distinguished from each other using discrimination information such as a flag, a category, or correlation information that is stored in the command DB 170.

Correlation information may be used to group devices on a home appliance network according to the manner in which a user operates the devices. For example, when a TV, a DVD player, a speaker, and an amplifier exist on a home appliance network, the correlation information may indicate that the DVD player outputs images to the TV, and audio to the speaker and the amplifier. After this correlation is defined, when a user turns on the DVD player to playback contents, the TV, the speaker, and the amplifier may also be turned on. Correlated devices may be grouped so that each device can operate with reference to the states of other devices.

Correlations between controlled devices can be classified as basic or user-defined correlations. The basic correlation may be pre-defined by the provider of the integrated remote control device by analyzing in which a user operates a controlled device. The user-defined correlation may be set by the user. The production of a user-defined correlation will be described later with reference to operations S430 and S440 of FIG. 4.

The control module 140 may receive information interpreted by the first modality recognition module 120, for example, text corresponding to speech, and information interpreted by the second modality recognition module 130, for example, a gesture set corresponding to a gesture, and combines the text and the gesture set to interpret the user's command. In order to interpret the command the control module 140 may extract portions that correspond to the controlled device and a state of the controlled device from this information.

When the user's command is interpreted, the control module 140 may extract from the command DB 170 the command that corresponds to the user's command.

In another embodiment, the control module 140 may extract from the command DB 170 the command corresponds to the user's command, receive state information about each relevant controlled device from the state monitoring module 150, and reconstruct a control command according to the state information. For example, if a user made a hand gesture indicating a command to turn on a controlled device while saying "turn on the TV", the control module 140 may recognize that the controlled device is the TV and the state of the TV must be set to on by combining the user's speech with the user's gesture, and extracting a command to turn on the TV from the command DB 170. At this time, if it is determined from state information about the TV in the control history (DB160 received from the state monitoring module 150) that the TV has already been turned on, the control module 140 may not produce a control command to turn on the TV.

In still another embodiment, the control module 140 may extract a command corresponding to the user's command from the command DB 170, extract correlation information from the command DB 170, if there is a correlation between the controlled devices, and reconstruct a control command according to the correlation and state information of the controlled device. When a complex control command consisting of simple control commands is stored in the command DB 170, the control module 140 may extract the simple control commands and remove unnecessary simple control commands according to state information within the control history DB 160. On the other hand, when the control module 140 automatically produces a series of simple control commands that constitute a complex control command, the control module 140 can transform the complex control command into a series of simple control commands according to correlation information relating to the relevant controlled device, and remove unnecessary simple control commands according to state information within the control history DB 160.

When a new controlled device is detected by interpretation of a user command, a new user-defined command or a new correlation may be produced. Both may be input by the user or automatically produced by the control module 140. This will be described later with reference to FIG. 6.

If the user command has an error, the control module 140 can process the error. If information received from the first and second modality recognition modules 120 and 130 is not sufficient, the control module 140 may interpret the user command by supplementing information included in the control history DB 160. For example, if a spoken command "play" is recognized but a controlled device is not recognized, and it is determined with reference to the control history DB 160 that a VCR was turned on right before the spoken command, the VCR can be presumed to be the controlled device, and a control command to play the VCR may be produced. On the other hand, if the user command has an irreconcilable error, a feedback mode that depends on the usage environment can be entered to provide feedback to the user through the output module 180. In other words, according to the degree of error in a user command, the error is automatically recovered from with reference to information included in the control history DB 160, or feedback informing the user of the error may be given. The control module 140 may synthesize inputs of two or more modalities to interpret a user's command. However, even when only one input is valid, the control module 140 can interpret the user's command based on the single valid input.

The state monitoring module 150 may monitor the states of the controlled devices on the home appliance network, reflect the states in the control history DB 160, and provide state information to the control module 140. When the states of the controlled devices are changed due to execution of a control command, the state monitoring module 150 may ascertain the change and reflects it in the control history DB 160.

The output module 180 may output the control command produced by the control module 140 or provide a user interface for a user input mode. An example of an output form of the control command is an encoded infrared signal. In some cases, the output module 180 may provide feedback regarding the user's command. The feedback mode can be set according to the usage environment. For example, in a circumstance where a volume must be lowered, or an audio player is playing loudly, a vibration-mode feedback may be more effective than a speech-mode feedback.

In the present embodiment, a case has been described where modules that constitute an integrated remote control device are included in a single device. However, the modules of the integrated remote control device may be distributed in a server or in each controlled device and still serve as an integrated remote control system by being connected to a control module via wired or wireless communications. Thus, an integrated remote control system according to an embodiment of the present invention can be significantly minimized and may have no fixed shape.

Figure 2:
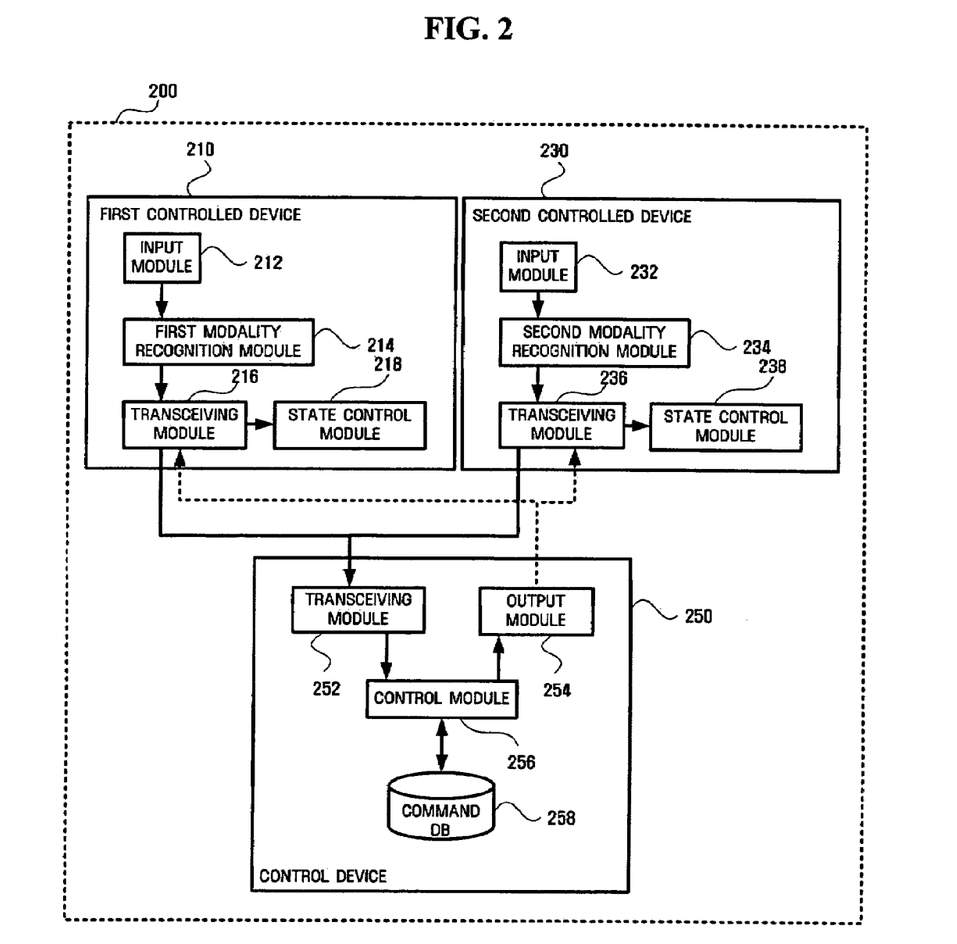
FIG. 2 is a block diagram of an integrated remote control system where modules, such as those of FIG. 1, are distributed, according to an embodiment of the present invention.

FIG. 2 is a block diagram of an integrated remote control system 200 where modules, such as those of FIG. 1, are distributed, according to an embodiment of the present invention. In the integrated remote control system 200, a control device 250 may remotely control first and second controlled devices 210 and 230 using a control command.

The control device 250 may be comprised of a command DB 258 for storing commands, a control module 256 for analyzing a user command and extracting a control command corresponding to the analyzed user command from the command DB 258, an output module 254 for outputting the control command, and a transceiving module 252 for receiving inputs of 2 or more modalities analyzed by the first and second controlled devices 210 and 230.

The first and second controlled devices 210 and 230 may include input modules 212 and 232, respectively, for receiving inputs of 2 or more modalities from a user, first and second modality recognition modules 214 and 234, respectively, for recognizing and analyzing inputs of first and second modalities received from the input modules 212 and 232, transceiving modules 216 and 236, respectively, for receiving the control command output by the output module 254 of the control device 250 and for transmitting information interpreted by the first and second modality recognition modules 214 and 234, and state control modules 218 and 238, respectively, for changing the states of the first and second controlled devices 210 and 230 according to the received control command.

In an operation of the integrated remote control system 200, the first and second controlled devices 210 and 230 may receive inputs of two or more modalities, recognize and interpret the inputs using the first and second modality recognition modules 214 and 234, and transmit information about the interpreted inputs to the control device 250 via the transceiving modules 216 and 236. The control device 250 may interpret a user command from a received input using the control module 256, extract a control command corresponding to the user command from the command DB 258, and transmit the control command to the first and second controlled devices 210 and 230 via the output module 254. In response to the control command, the first and second controlled devices 210 and 230 may change their states using the state control modules 218 and 238. The modules of the integrated remote control device 100 of FIG. 1 may be scattered to controlled devices and a control device that remotely controls the controlled devices. Possible embodiments of the distributed modules are described below, not by way of limitation, but by way of example.

In a first embodiment, where a controlled device may recognize and interpret inputs of two or more modalities, and a control device may produce and output a control command, the control device may include a control module, a command DB, and an output module, and the controlled device may include an input module, a first modality recognition module, and a second modality recognition module.

In a second embodiment, where a controlled device may only receive inputs of two or more modalities and a control device may recognize the received modalities and produce and output control commands corresponding to the recognized modalities, the control device may include a control module, a command DB, an output module, and first and second modality recognition modules, and the controlled device may include an input module.

In a third embodiment that is essentially the same as the first embodiment except that a control device may additionally perform a state monitoring function, the control device may include a control module, a command DB, an output module, a control history DB, and a state monitoring module, and a controlled device may include an input module, a first modality recognition module, and a second modality recognition module.

In a fourth embodiment that is essentially the same as the first embodiment except that a controlled device may additionally perform a state monitoring function, a control device may include a control module, a command DB, and an output module, and the controlled device may include an input module, a first modality recognition module, a second modality recognition module, a control history DB, and a state monitoring module.

In a fifth embodiment that is essentially the same as the second embodiment except that a control device may additionally perform a state monitoring function, the control device may include a control module, a command DB, an output module, a first modality recognition module, a second modality recognition module, a control history DB, and a state monitoring module, and a controlled device may include an input module.

In a sixth embodiment that is essentially the same as the second embodiment except that a controlled device may additionally perform a state monitoring function, a control device may include a control module, a command DB, an output module, a first modality recognition module, and a second modality recognition module, and the controlled device may include an input module, a control history DB, and a state monitoring module.

Besides the above combinations, the modules of the integrated remote control device 100 of FIG. 1, excluding the control module, may be distributed to several controlled devices. Thus, remote control systems based on all possible combinations are possible.

Figure 3:
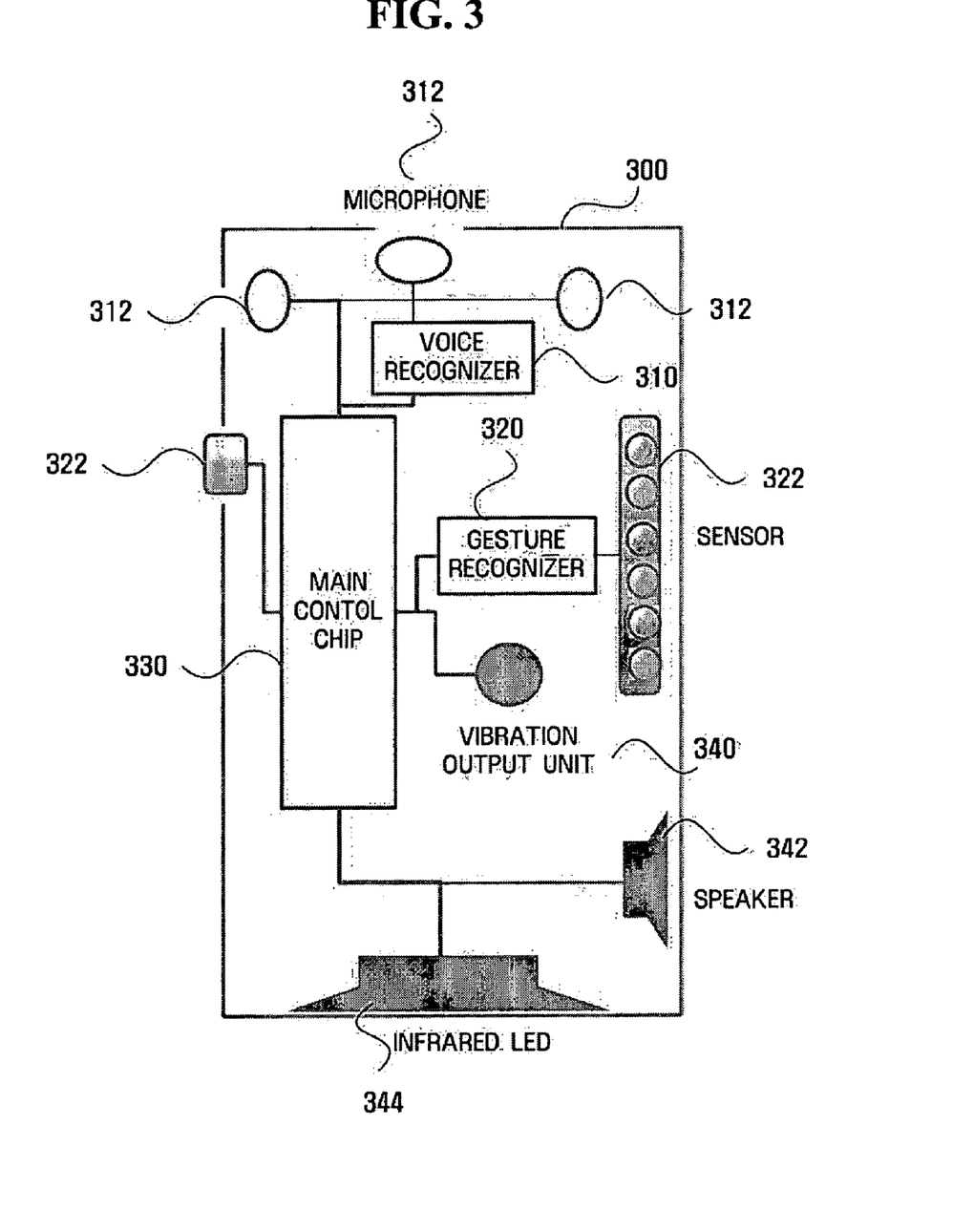
FIG. 3 is a schematic representation of a hardware structure of an integrated remote control device, according to an embodiment of the present invention.

FIG. 3 is a schematic representation of a hardware structure of an integrated remote control device 300, according to an embodiment of the present invention. The integrated remote control device 300 may comprise a microphone 312, a speech recognizer 310, a sensor 322, a gesture recognizer 320, a main control chip 330, and an infrared light emitting diode (LED) 344. The microphone 312 may receive speech of a user, and the speech recognizer 310 may recognize and interpret this speech. The sensor 322 may sense a gesture of the user, and the gesture recognizer 320 may recognize and interpret this gesture. The main control chip 330 may interpret a user's command by combining the speech and the gesture interpreted by the speech recognizer 310 and the gesture recognizer 320, respectively, and it then may produce a control command corresponding to the user's command. Although the main control chip 330 may be a single chip in this embodiment, it may alternatively comprise two or more chips. It is apparent to one of ordinary skill in the art that the main control chip 330 may be implemented in hardware or software. The control command produced by the main control chip 330 may be encoded into an infrared signal, which may be emitted from the infrared LED 344 to control the state of an electronic product.

To transmit output data in various modes to the user, a vibration output unit 340 or a speaker 342 may be further installed as an output device.

In this embodiment, the speech recognizer 310 may serve as a first modality recognizer, and the gesture recognizer 320 may serve as a second modality recognizer. This is merely exemplary, and the speech recognizer 310 and the gesture recognizer 320 may be replaced by hardware that may recognize other input such as a smell, a vibration, or the like.

Although the components of the remote control device 300 may be incorporated into a single hardware device, this is just an exemplary embodiment. As described above in FIG. 2, the components of the remote control device 300 may be distributed in a server or in separate electronic products but still serve as an integrated remote control device by being connected to a main control chip via wired or wireless communication. Thus, an integrated remote control device according to an embodiment of the present invention may be significantly minimized and may not have a fixed form.

Figure 4:
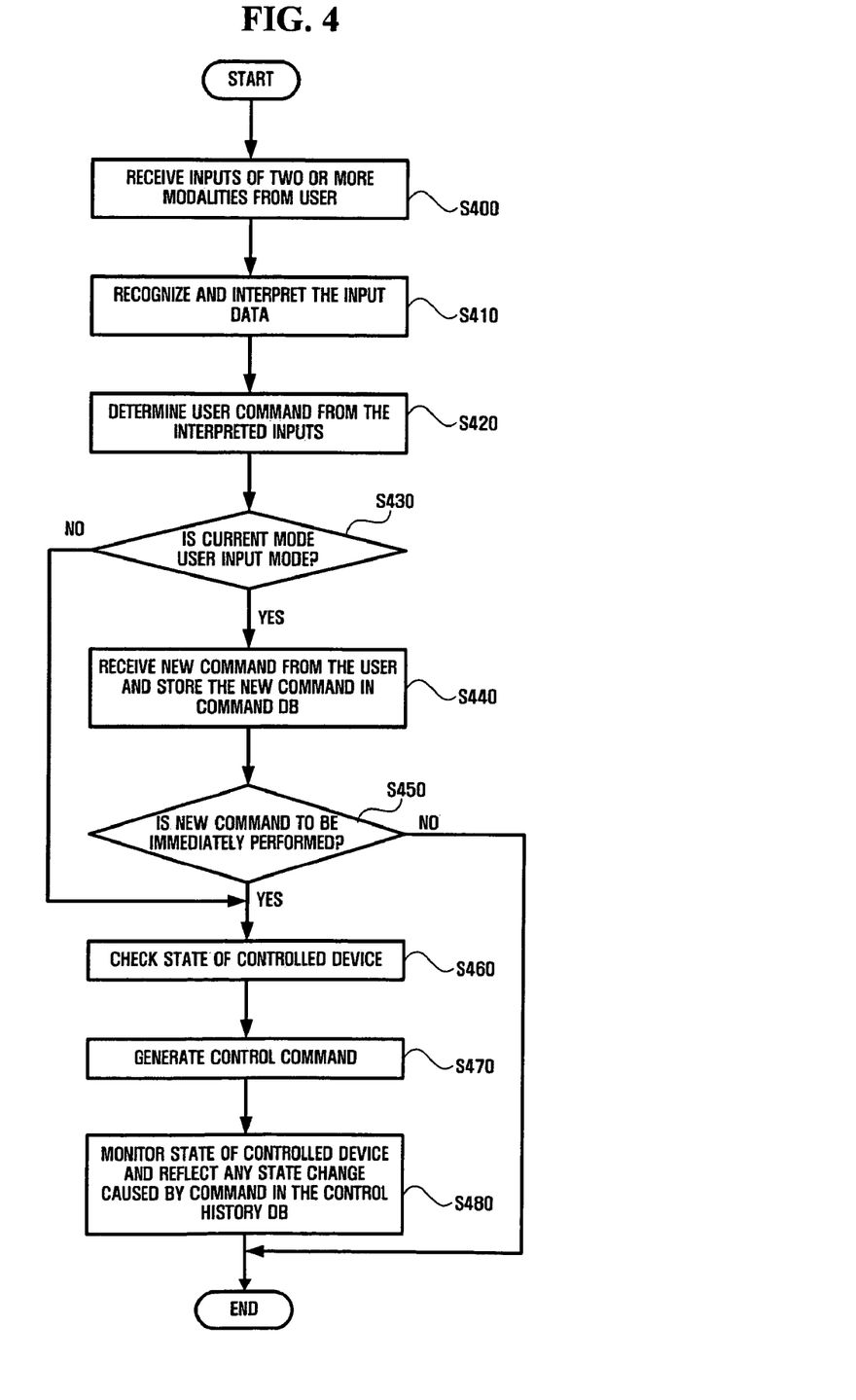
FIG. 4 is a flowchart of an integrated remote control method, according to an embodiment of the present invention.

FIG. 4 is a flowchart of an integrated remote controlling method, according to an embodiment of the present invention. Referring to FIG. 4, first, when the input module 110 receives inputs of two or more modalities from a user in operation S400 the first and second modality recognition modules 120 and 130 may recognize and interpret the input data and send the interpreted data to the control module 140 in operation S410. The control module 140 may combine the interpreted input data of two or more modalities to determine a user command in operation S420.

When the current mode is a user input mode in operation S430, the control module 140 may provide feedback that enables the user to input a command. Through the user input mode, the user can produce a new user-defined command or revise the basic commands provided by the integrated remote control device. This is possible for not only simple control commands but also a complex control commands. In addition, the user can define a new correlation between controlled devices or revise a basic correlation therebetween.

The command or correlation input by a user may be checked against the basic commands or correlations provided by a remote control device. If the user tries to revise a basic command or correlation that cannot be changed, the remote control device can provide feedback showing that this is not permissible.

In operation S440, the control module 140 may store information about the command or a correlation produced or revised by the user in the command DB 170. When the command produced or changed by the user is to be immediately performed in operation S450, the state monitoring module 150 may check the state of a controlled device, in operation S460. The control module 140 may extract a command from the command DB 170 and reconstruct a control command according to the information about the state of the controlled device, in operation S470. The control module 140 may execute operation S470 without undergoing operation S460.

On the other hand, when the current mode is not the user input mode in operation S430, the state monitoring module 150 may check the state of the controlled device, in operation S460. In operation S470, the control module 140 may reconstruct a command extracted from the command DB 170 according to the information about the state of the controlled device to produce a control command. The state monitoring module 150 may monitor a state of the controlled device that is changed by executing the control command, and reflect this change in the control history DB 160, in operation S480.

Figure 5:
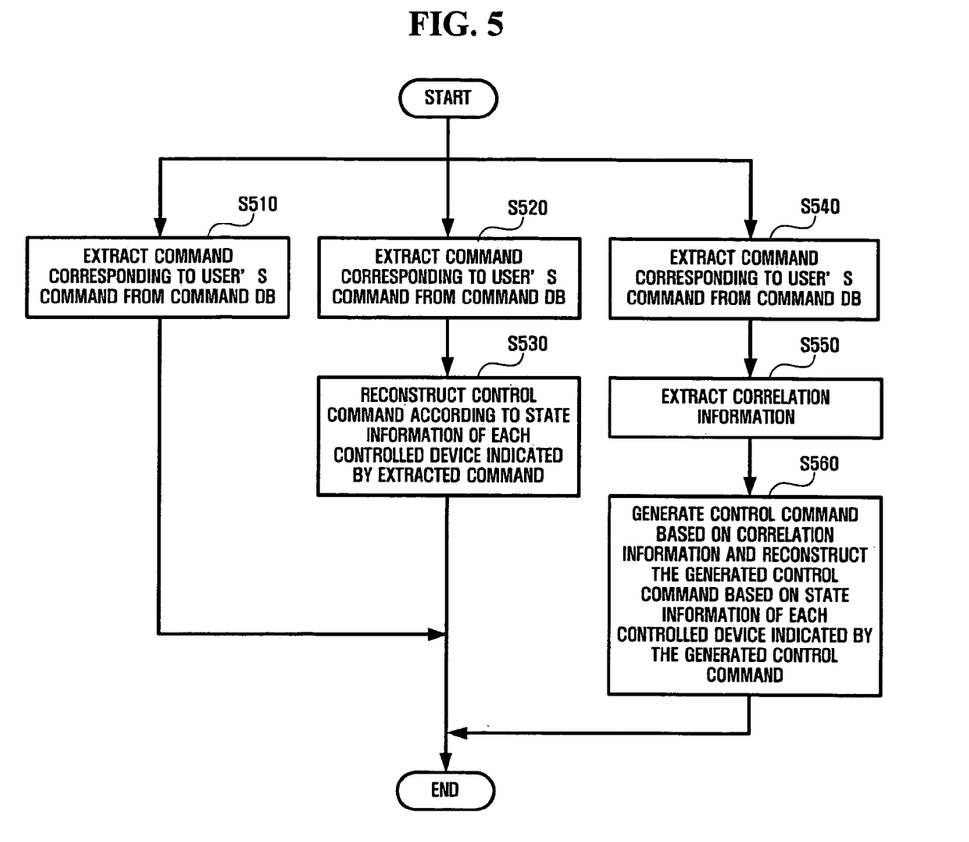
FIG. 5 is a flowchart of different embodiments of a control command generation operation, such as S470 of FIG. 4, according to embodiments of the present invention.

FIG. 5 is a flowchart of different embodiments of a control command generation operation, such as S470 of FIG. 4, according to embodiments of the present invention. In one embodiment, when a user's command is interpreted, the control module 140 may extract a command corresponding to the user's command from the command DB 170, as in operation S510.

In another embodiment, first, the control module 140 may extract a command corresponding to the user's command from the command DB 170, as in operation S520. Thereafter, in operation S530, state information about each controlled device indicated by the extracted command may be received from the state monitoring module 150, and a control command can be reconstructed according to this state information.

In still another embodiment, first, in operation S540, the control module 140 may extract a command corresponding to the user's command from the command DB 170. Next, in operation S550, if there exists a correlation between controlled devices, correlation information may be extracted from the command DB 170. Then, in operation S560, a control command can be reconstructed according to this correlation information and information about the state of the controlled device. When a series of simple control commands that constitute a complex control command are stored in the command DB 170, the control module 140 may remove unnecessary simple control commands from the simple control command according to state information stored in the control history DB 160. On the other hand, when the control module 140 automatically produces a series of simple control commands that constitute a complex control command, the control module 140 may transform the complex control command into a series of simple control commands according to the correlation information relating to the controlled device, and remove unnecessary simple control commands according to the state information within the control history DB 160.

Figure 6:
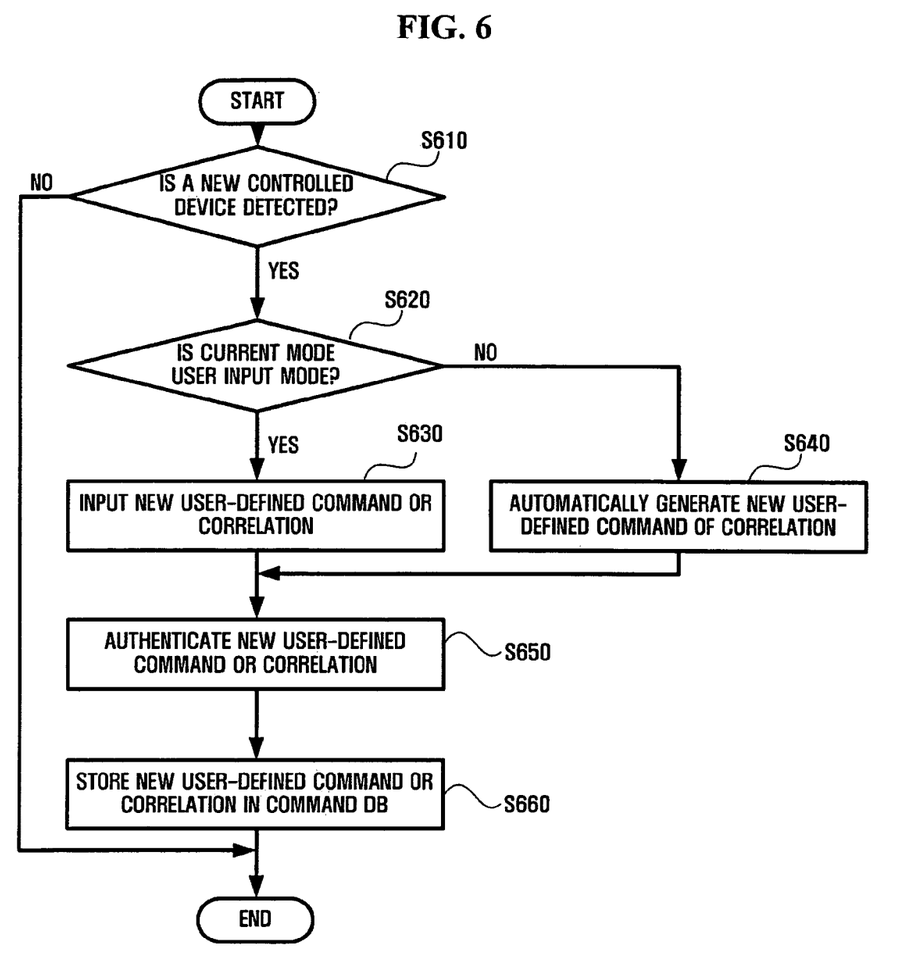
FIG. 6 is a flowchart of an operation of a remote control device when a new controlled device has been detected, according to an embodiment of the present invention.

FIG. 6 is a flowchart of an operation of the integrated remote control device 100 when a new controlled device has been detected, according to an embodiment of the present invention. When the control module 140 detects a new controlled device (S610) other than controlled devices indicated by the basic commands provided by the integrated remote control device 100, a new user-defined command corresponding to the user command may be defined. If the newly detected device must operate in correlation with other devices in a home appliance network, a new correlation can be defined. If the current mode is a user input mode in operation S620, a new user-defined command and a new user-defined correlation may be input directly by the user in operation S630. Conversely, if the current mode is not the user input mode in operation S620, the new user-defined command and the new user-defined correlation can be automatically produced by the control module 140, in operation S640.

In operation S660, the control module 140 may authenticate the new user-defined command and the new user-defined correlation in operation S650 and store them in the command DB 170.

Figure 7:
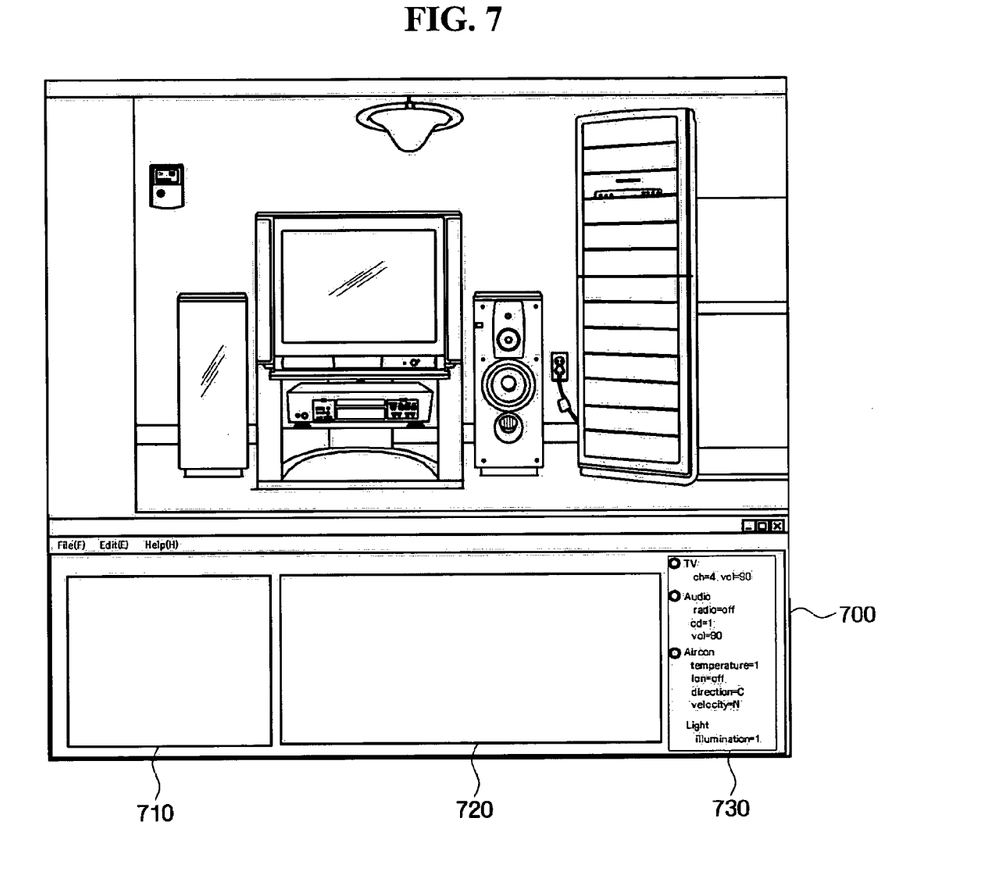
FIGS. 7 and 8 are schematic representations of an integrated remote control, according to an embodiment of the present invention.
Figure 8:
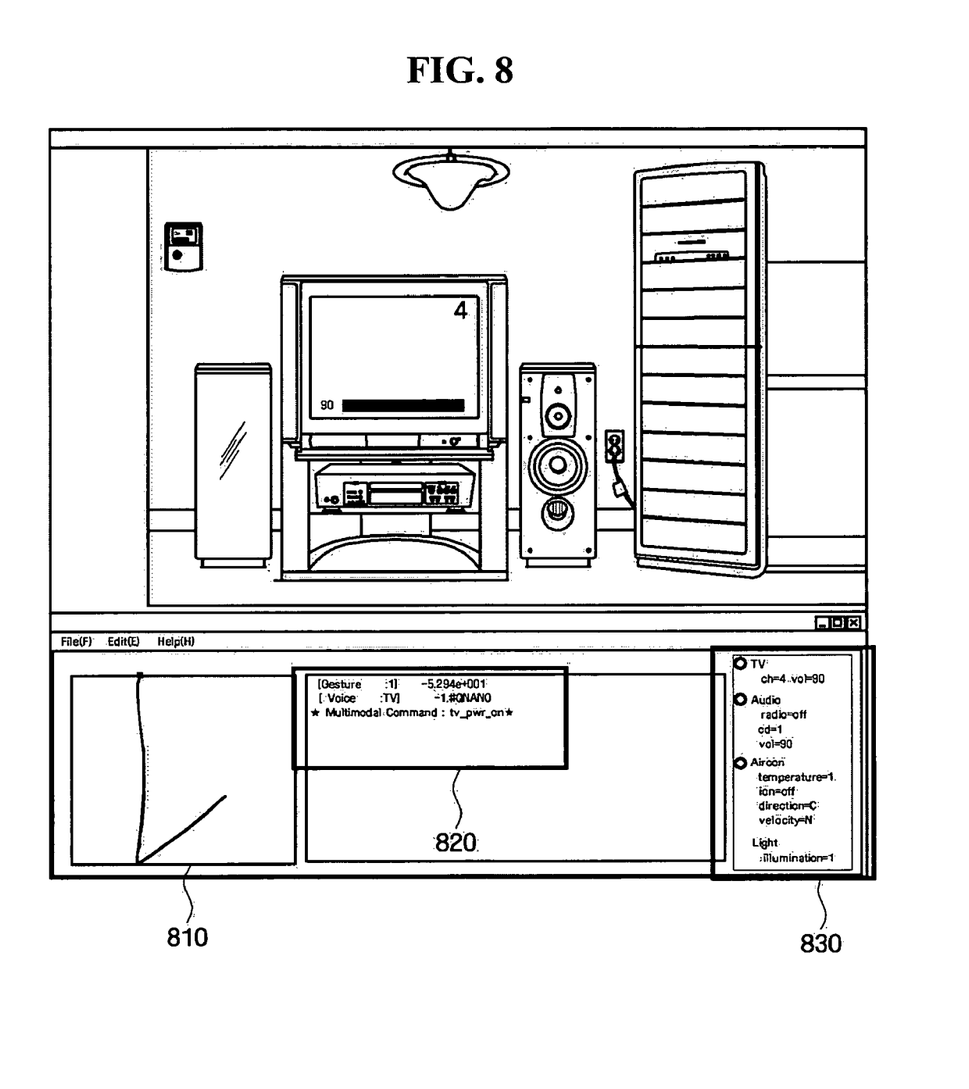

FIGS. 7 and 8 are schematic representations of an integrated remote control, according to an embodiment of the present invention. A user interface 700 where a TV, an audio player, an air conditioner, and a lamp on a home appliance network are remotely controlled by a user command is illustrated in FIGS. 7 and 8.

The user interface 700 may comprise an area 710 for displaying a gesture of a user, an area 720 for displaying a control command produced according to the user command, and an area 730 for displaying information about states of devices stored in a control history DB. Referring to FIG. 8, when the user says "TV" and simultaneously makes a gesture indicating a command to turn on a device, an area 810 for displaying a user gesture may recognize and display the gesture of the user. An area 820 for displaying a control command may display a control command to turn on the TV produced. An area 830 for displaying information about the states of devices stored in a control history DB may display that the TV is turned on to the channel that the TV was tuned to when last turned off.

Up to now, a case where a user command is recognized from a speech input and a gesture input was primarily described. However, speech and gestures are just examples of multiple modes that can be recognized by an integrated remote control according to embodiments of the present invention. Thus, it is apparent to one of ordinary skill in the art that various mode inputs may be used without departing from the spirit and scope of the present invention.

The integrated remote control device and method according to the embodiments of the present invention as described above have at least one of the following effects.

First, a user command can be interpreted with a low error rate by combining inputs of two or more modes together thereby offsetting a defect of each of the modes.

Second, a complex remote control can be achieved that accepts a single user command thereby reducing the number of multiple command operations required to remotely control a plurality of electronic products that operate in correlation with each other.

Third, a remote control device can be minimized and simplified by using input data of modes other than a button mode.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An integrated remote control device receiving multi-modal inputs, the device comprising:
   an input module that receives inputs of at least two modalities from a user;
   a first modality recognition module that recognizes and interprets an input of a first modality received from the input module;
   a second modality recognition module that recognizes and interprets an input of a second modality received from the input module;
   a command database (DB) that stores commands and correlation information between controlled devices, wherein the correlation information includes grouping information of controlled devices on a home appliances network according to the manner in which the user operates the devices;
   a control module that interprets a user command by synthesizing information about the inputs interpreted by the first and second modality recognition modules, and extracts a control command from the command DB, the control command being for remotely controlling a plurality of devices and corresponding to the interpreted user command;
   an output module that outputs the control command extracted by the control module; and
   a state monitoring module that checks the state of the controlled device, monitors the state of the controlled device upon execution of the control command, and reflects any changes in the state of the controlled device in a control history DB,
   wherein, when the inputs interpreted by the first and second modality recognition modules are insufficient to interpret a particular control command due to error, the control module also interprets the particular control command using the state information from the control history and using the correlation information that indicates a relationship of the controlled device to other controlled devices.

2. The integrated remote control device of claim 1, wherein the commands comprise simple commands and complex control commands comprising at least some of the simple commands.

3. The integrated remote control device of claim 1, wherein the commands comprise basic commands pre-defined by a provider of the integrated remote control device, and user-defined commands.

4. The integrated remote control device of claim 1, wherein the control history DB further stores information about the state of the controlled device that is changed upon execution of the control command.

5. The integrated remote control device of claim 4, wherein upon interpretation of the user command, the controlled device and a portion that controls the state of the controlled device are extracted from information that is interpreted by the first and second modality recognition modules, and if an error is detected as a result of the extraction, the error is automatically recovered from based on information stored in the control history DB or feedback informing the user of the error is provided to the user, depending on the degree of the error.

6. The integrated remote control device of claim 5, wherein the feedback is output in different modes according to a usage environment.

7. The integrated remote control device of claim 4, wherein the control command extracted by the control module is reconstructed according to the state information of a controlled device.

8. The integrated remote control device of claim 1, wherein the input of the first modality comprises a voice.

9. The integrated remote control device of claim 1, wherein the input of the second modality comprises a gesture.

10. The integrated remote control device of claim 1, wherein the control module interprets the command of the user, and, in a user input mode, receives a new user-defined command from the user and stores the user-defined command in the command DB.

11. The integrated remote control device of claim 1, wherein when the control module detects a new controlled device by interpreting a command of the user, the control module automatically produces a new user-defined command corresponding to the command of the user, and a correlation between the new controlled device and other controlled devices, authenticates the new user-defined command and the correlation, and stores the new user-defined command and the correlation in the command DB.

12. The integrated remote control device of claim 1, wherein when the control module detects a new controlled device by interpreting a command of the user, the control module receives a new user-defined command and a correlation between the new controlled device and other controlled devices from the user, authenticates the new user-defined command and the correlation, and stores the new user-defined command and the correlation in the command DB.

13. An integrated remote control system in which a control device remotely controls a controlled device using a control command, the control device comprising:
   a command database (DB) that stores commands and correlation information between controlled devices, wherein the correlation information includes grouping information of controlled devices on a home appliances network according to the manner in which a user operates the devices;
   a control module that interprets a command of a user and extracts a control command corresponding to the interpreted user command from the command DB; and an output module that outputs the control command extracted by the control module, wherein the controlled device comprises:
   a receiving module that receives the control command outputted by the output module; and wherein at least one of the control device and the controlled device include,
   an input module that receives inputs of at least two modalities from the user,
   a first modality recognition module that recognizes and interprets an input of a first modality received from the input module, and
   a second modality recognition module that recognizes and interprets an input of a second modality received from the input module are included in at least one of the control device and the controlled device, and wherein
   the control module interprets the command of the user by synthesizing information about the inputs interpreted by the first and second modality recognition modules, and extracts a control command from the command DB, the control command being for remotely controlling a plurality of devices and corresponding to the interpreted user command;
   and a state monitoring module that checks the state of the controlled device, monitors the state of the controlled device upon execution of the control command, and reflects any changes in the state of the controlled device in a control history DB, wherein, when the inputs interpreted by the first and second modality recognition modules are insufficient to interpret a particular control command due to error, the control module also interprets the particular control command using the state information from the control history and using the correlation information that indicates a relationship of the controlled device to other controlled devices.

14. The integrated remote control system of claim 13, wherein the commands comprise simple commands and complex control commands that comprise at least some of the simple commands.

15. The integrated remote control system of claim 13, wherein the commands comprise basic commands pre-defined by a provider of the integrated remote control device, and user-defined commands.

16. The integrated remote control system of claim 13, wherein at least one of the control device and the controlled device further comprises the control history DB and where the control history DB stores information about the state of the controlled device that is changed upon execution of the control command.

17. The integrated remote control system of claim 16, wherein upon interpretation of the user command by the control module, the controlled device and a portion that controls the state of the controlled device are extracted from the input, and if an error is detected, the error is automatically recovered from based on information stored in the control history DB or a feedback informing the user of the error is provided to the user, depending on the degree of the error.

18. The integrated remote control system of claim 17, wherein the feedback is output in different modes according to a usage environment.

19. The integrated remote control system of claim 16, wherein the control command extracted by the control module is reconstructed according to the state information of a controlled device.

20. The integrated remote control system of claim 13, wherein the input of the first modality comprises a voice.

21. The integrated remote control system of claim 13, wherein the input of the second modality comprises a gesture.

22. The integrated remote control system of claim 13, wherein the control module interprets the command of the user and, in a user input mode, receives a new user-defined command from the user and stores the user-defined command in the command DB.

23. The integrated remote control system of claim 13, wherein when the control module detects a new controlled device by interpreting a command of the user, the control module automatically produces a new user-defined command corresponding to the command of the user and a correlation between the new controlled device and other controlled devices, authenticates the new user-defined command and the correlation, and stores the new user-defined command and the correlation in the command DB.

24. The integrated remote control system of claim 13, wherein when the control module detects a new controlled device by interpreting a command of the user, the control module receives a new user-defined command and a correlation between the new controlled device and other controlled devices from the user, authenticates the new user-defined command and the correlation, and stores the new user-defined command and the correlation in the command DB.

25. An integrated remote control method receiving multimodal inputs, the method comprising:

receiving by a remote control inputs of at least two modalities from a user;

recognizing and interpreting each of the inputs of at least two modalities;

storing commands and correlation information between controlled devices, wherein the correlation information includes grouping information of controlled devices on a home appliances network according to the manner in which a user operates the controlled devices;

interpreting a command of the user by synthesizing the inputs of at least two modalities;

extracting a control command for remotely controlling a plurality of devices, the control command corresponding to the interpreted user command;

checking a state of the controlled device, monitoring the state of the controlled device upon execution of the control command, and reflecting any changes in the state of the controlled device in a control history DB, wherein, when the inputs of the at least two modalities are insufficient to interpret a particular control command due to error, the particular control command is further interpreted using the state information from the control history DB and using the correlation information that indicates a relationship of the controlled device to other controlled devices; and outputting by the remote control the extracted control command.

26. The integrated remote control method of claim 25, wherein the interpreting of the user command comprises: extracting the controlled device and a portion that controls the state of the controlled device from the inputs of at least two modalities; and if an error is detected in the extracted portions, automatically recovering from the error based on information stored in the control history DB or providing feedback informing the user of the errors, according to the degree of the error.

27. The integrated remote control method of claim 26, wherein a feedback to the user is output in different modes according to a usage environment.

28. The integrated remote control method of claim 25, wherein at least one of the inputs of the two or more modalities comprises speech.

29. The integrated remote control method of claim 25, wherein at least one of the inputs of the two or more modalities comprises a gesture.

30. The integrated remote control method of claim 25, further comprising receiving a new user-defined command from the user in a user input mode and storing the user-defined command in a command DB after the initial interpretation of the user command.

31. The integrated remote control method of claim 25, wherein the extracting of the control command comprises:

extracting a control command corresponding to the interpreted user command; and reconstructing the control command according to state information about a controlled device indicated by the extracted control command.

32. The integrated remote control method of claim 25 further comprising:

automatically producing a new user-defined command corresponding to the user command and a correlation between a new controlled device and other controlled device;

authenticating the new user-defined command and the correlation; and storing the new user-defined command and the correlation in the command DB when the new controlled device is detected as a result of the interpretation of the user command.

33. The integrated remote control method of claim 25 further comprising:
when a new controlled device is detected as a result of the interpretation of the user command, receiving a new user-defined command and a new user-defined correlation from a user;
authenticating the new user-defined command and the new user-defined correlation; and
storing the authenticated new user-defined command and new user-defined correlation in the command DB.

34. A storage for controlling a device according to an integrated remote control method receiving multi-modal inputs, the method comprising:
receiving by a remote control inputs of at least two modalities from a user;
recognizing and interpreting each of the inputs of at least two modalities;
storing commands and correlation information between controlled devices, wherein the correlation information includes grouping information of controlled devices on a home appliances network according to the manner in which a user operates the controlled devices;
interpreting a command of the user by synthesizing the inputs of the at least two modalities;
extracting a control command for remotely controlling a plurality of devices, the control command corresponding to the interpreted user command;
checking a state of the controlled device, monitoring the state of the controlled device upon execution of the control command, and reflecting any changes in the state of the controlled device in a control history DB;
wherein, when the inputs of the at least two modalities are insufficient to interpret a particular control command due to error, the particular control command is further interpreted using the state information from the control history DB and using the correlation information that indicates a relationship of the controlled device to other controlled devices; and
outputting by the remote control the extracted control command.

35. An integrated remote control device receiving multi-modal inputs, the device comprising:
an input module that receives inputs of at least two modalities from a user;
a first modality recognition module that recognizes and interprets an input of a first modality received from the input module;
a second modality recognition module that recognizes and interprets an input of a second modality received from the input module; a command database(DB) that stores commands and correlation information between controlled devices, wherein the correlation information includes grouping information of controlled devices on a home appliances network according to the manner in which a user operates the devices;
a control module that interprets a user command by synthesizing information about the inputs interpreted by the first and second modality recognition modules, and extracts a control command that corresponds to the interpreted user command from the command DB;
a control history DB that stores information about a state of a controlled device that is changed upon execution of the control command; and
a state monitoring module that checks the state of the controlled device, monitors the state of the controlled device upon execution of the control command, and reflects any changes in the state of the controlled device in the control history DB,
wherein, when the inputs interpreted by the first and second modality recognition modules are insufficient to interpret a particular control command due to error, the control module also interprets the particular control command using the state information from the control history and using the correlation information that indicates a relationship of the controlled device to other controlled devices.

36. the intergrated remote control device of claim 1, wherein the control command can be extractable according to characteristics of the plurality of devices.

* * * * *

UNITED STATES PATENT AND TRADEMARK OFFICE
CERTIFICATE OF CORRECTION

PATENT NO. : 7,538,711 B2 Page 1 of 1
APPLICATION NO. : 11/233114
DATED : May 26, 2009
INVENTOR(S) : Ji-hye Chung et al.

It is certified that error appears in the above-identified patent and that said Letters Patent is hereby corrected as shown below:

Column 16, Line 39, change "the intergrated" to --The integrated--.

Signed and Sealed this

First Day of September, 2009

David J. Kappos
*Director of the United States Patent and Trademark Office*